May 19, 1970     J. D. GRIFFITH     3,512,513
ELASTIC TYPE MULTISTAGE CATAPULT
Filed Aug. 7, 1967     9 Sheets-Sheet 3
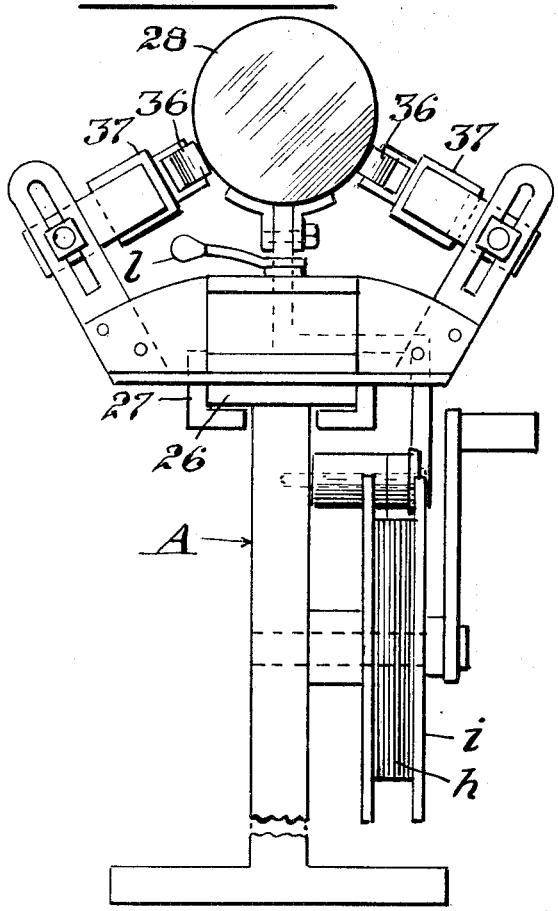
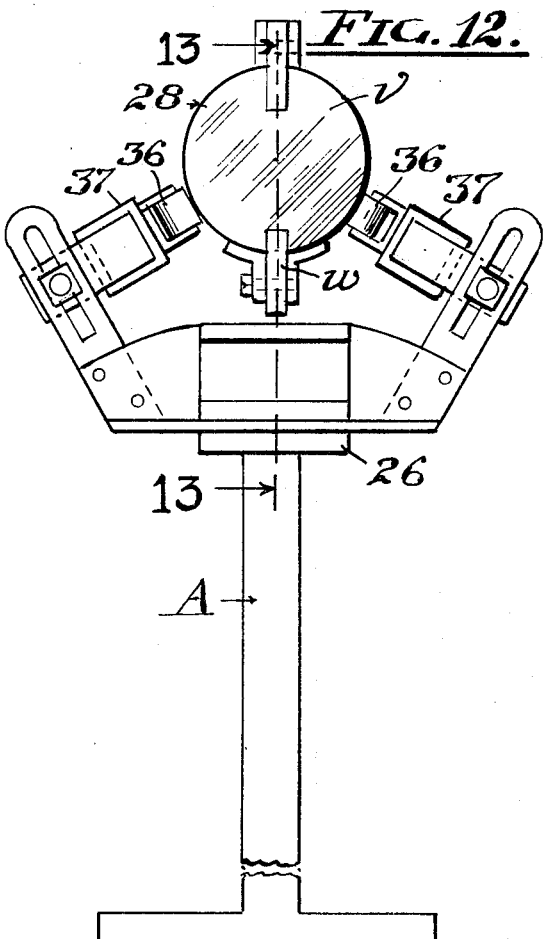
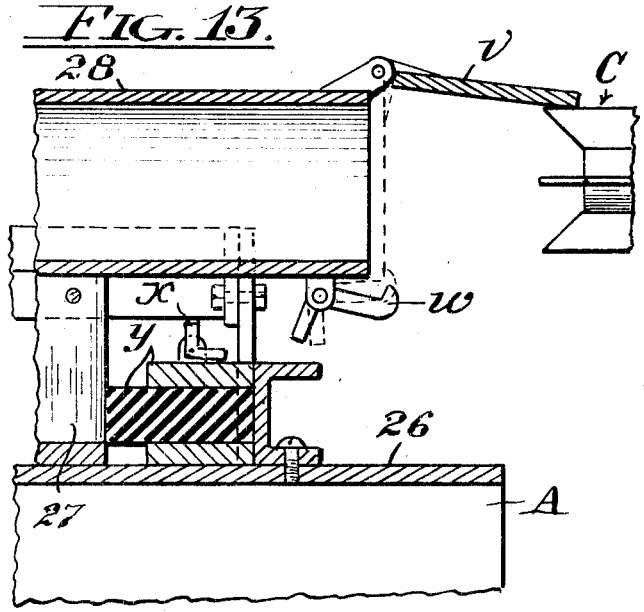
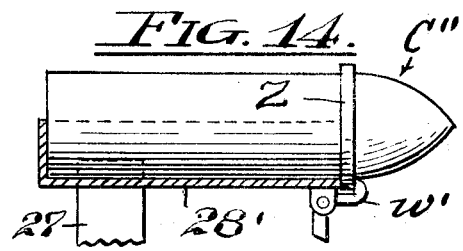
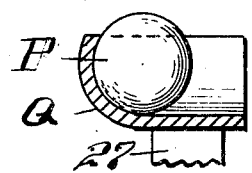
INVENTOR
John D. Griffith
BY
R. S. Berry
ATTORNEY May 19, 1970  J. D. GRIFFITH  3,512,513
ELASTIC TYPE MULTISTAGE CATAPULT
Filed Aug. 7, 1967  9 Sheets-Sheet 4
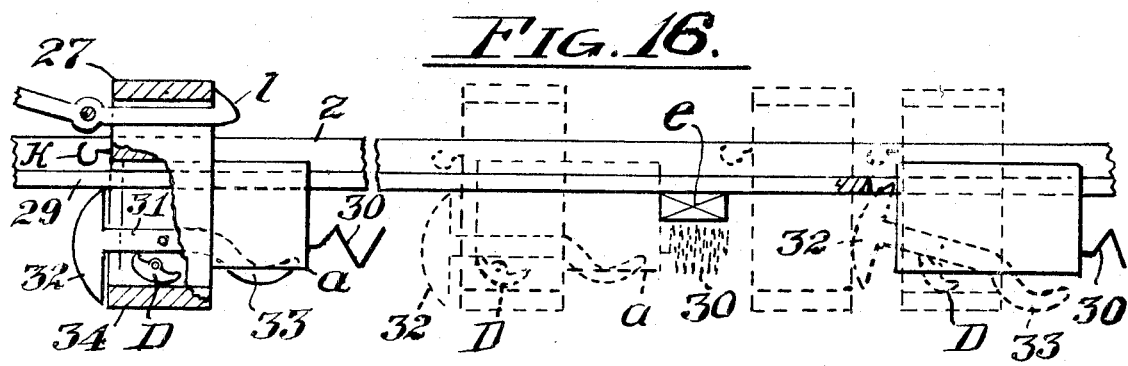
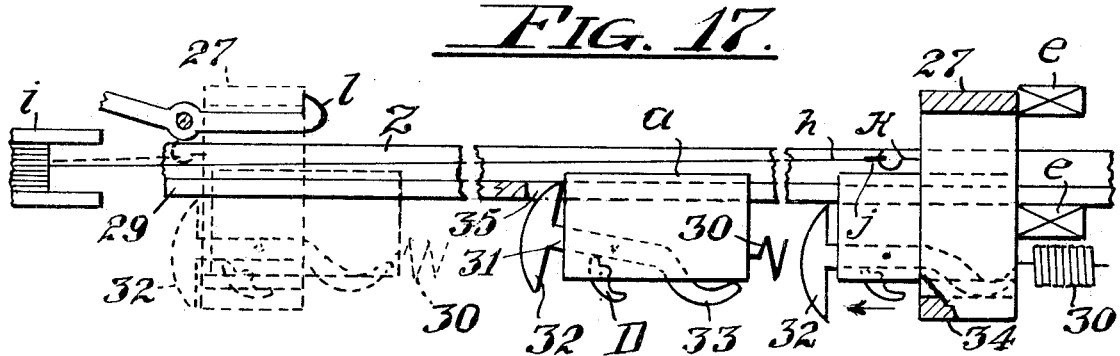
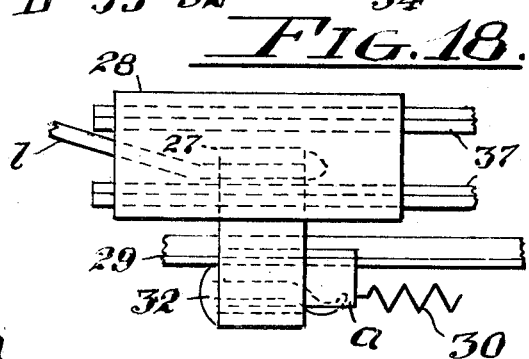
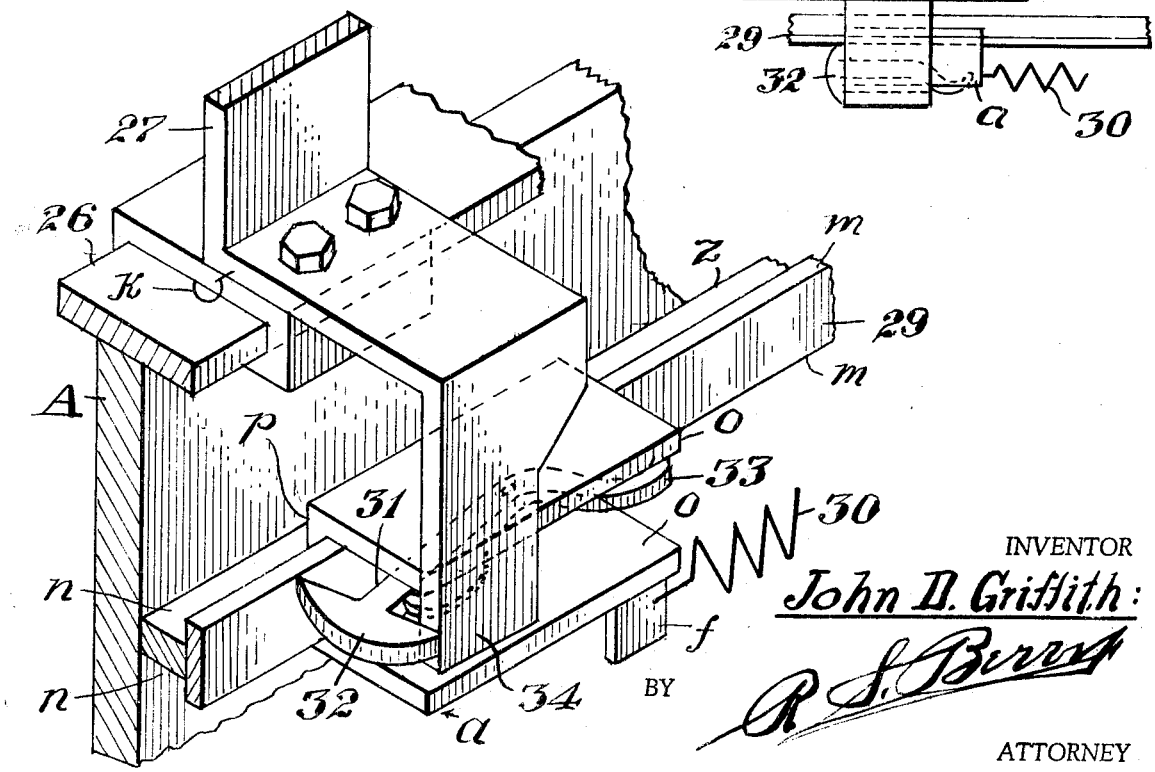
INVENTOR
John D. Griffith
BY R. S. Berry
ATTORNEY

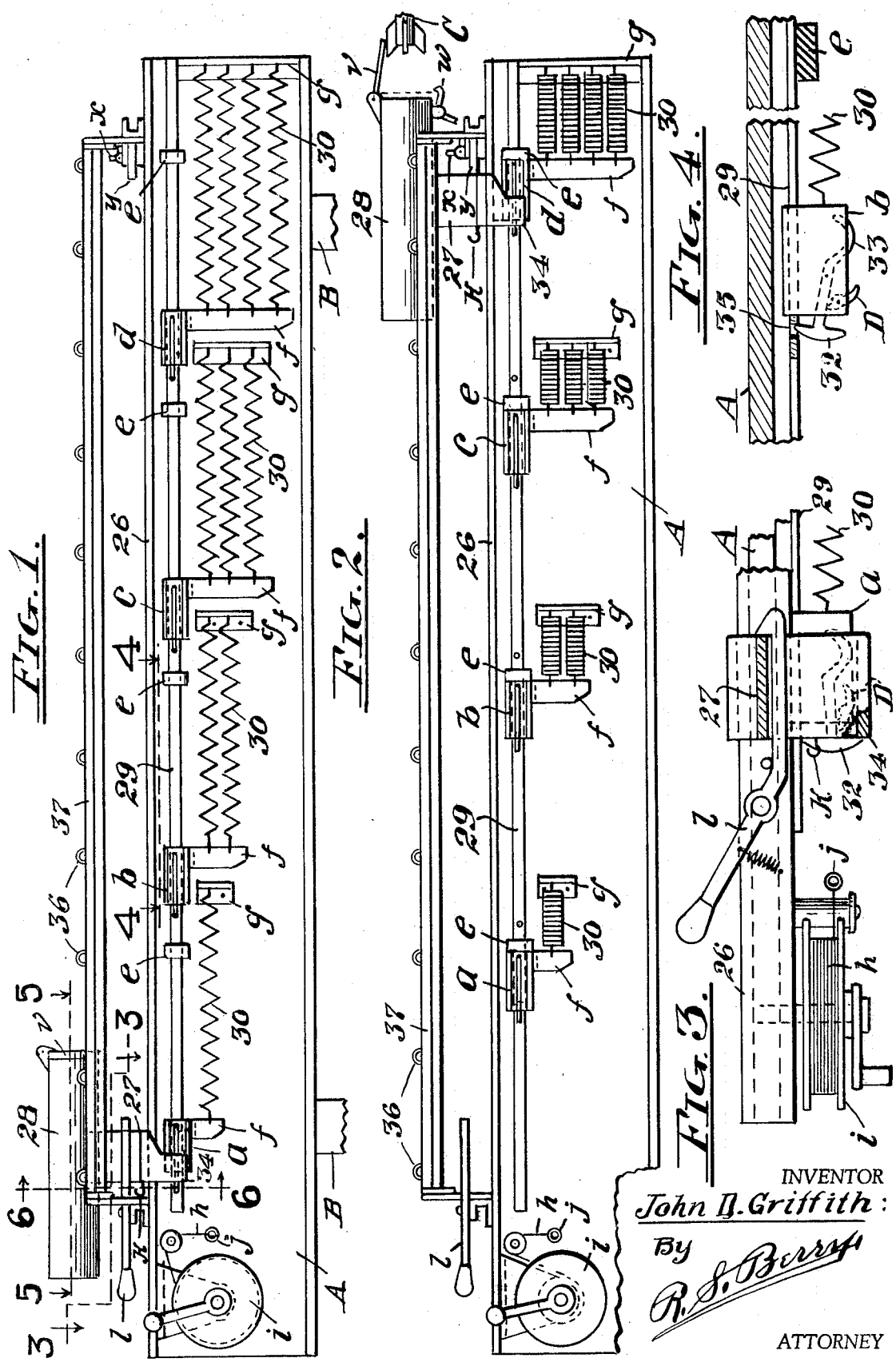

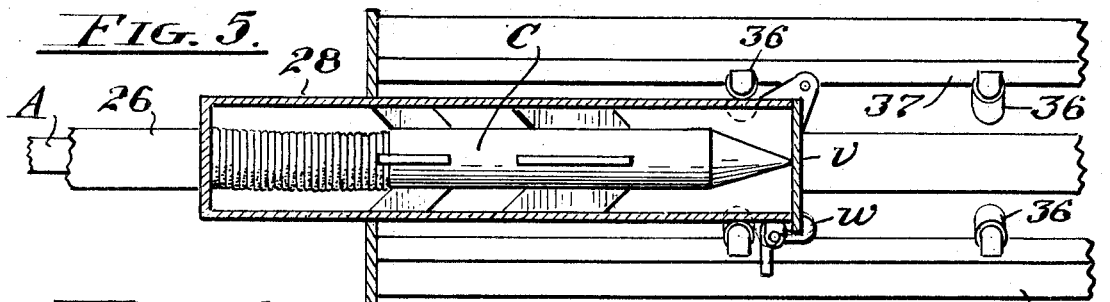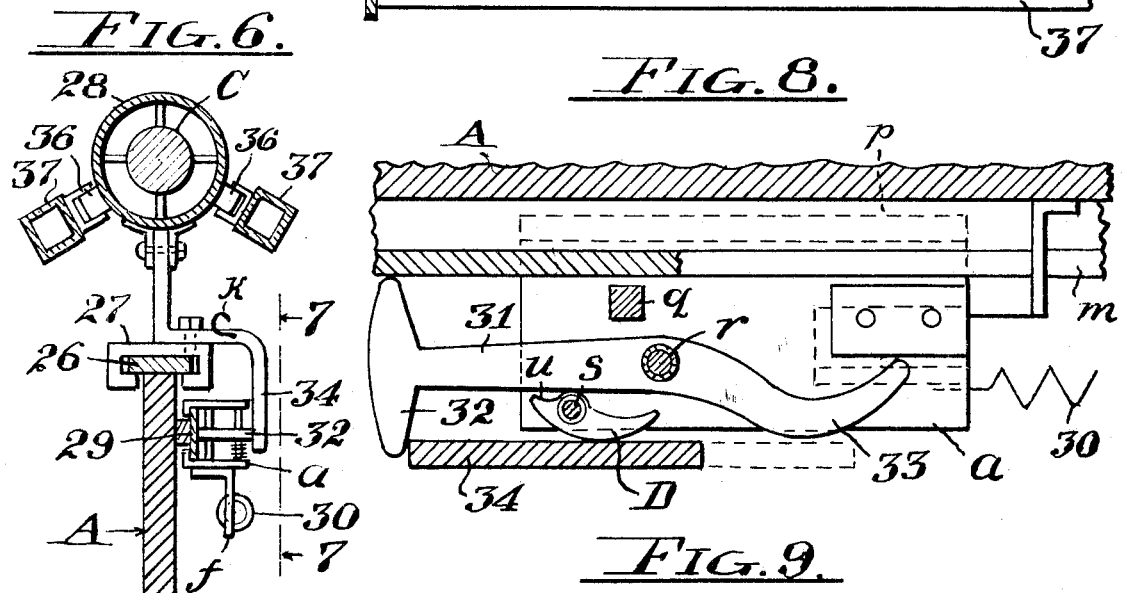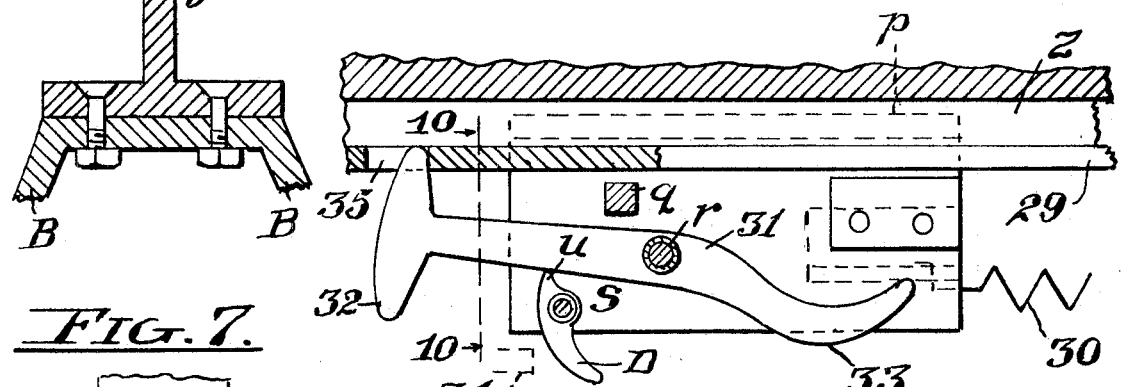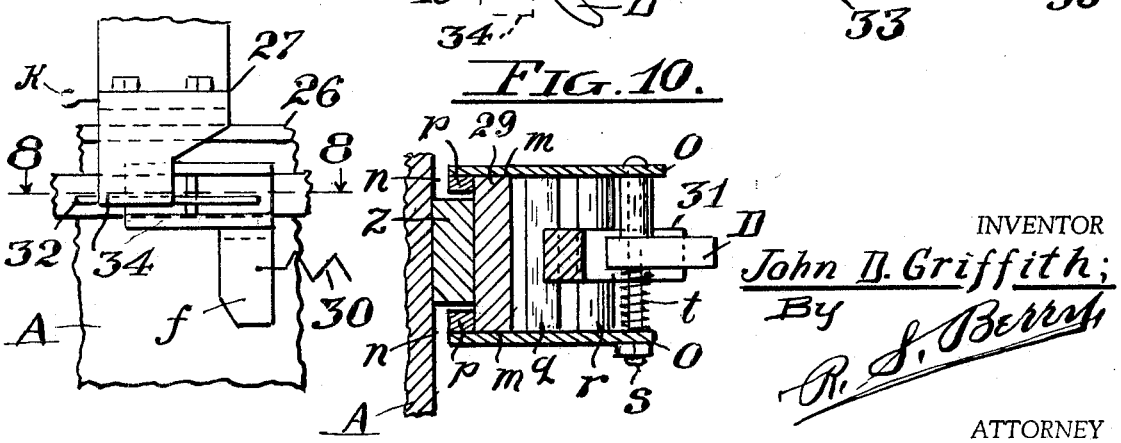

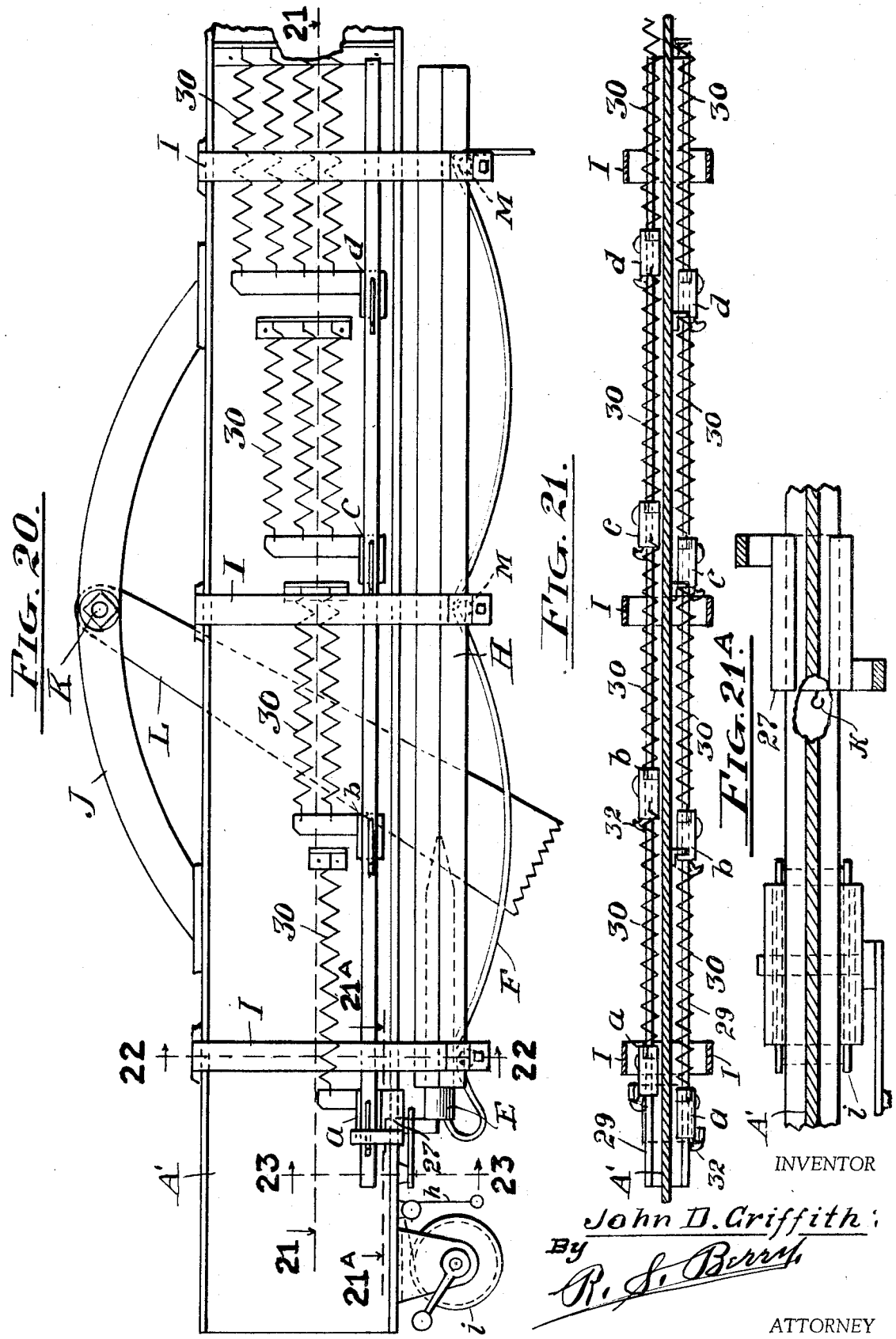

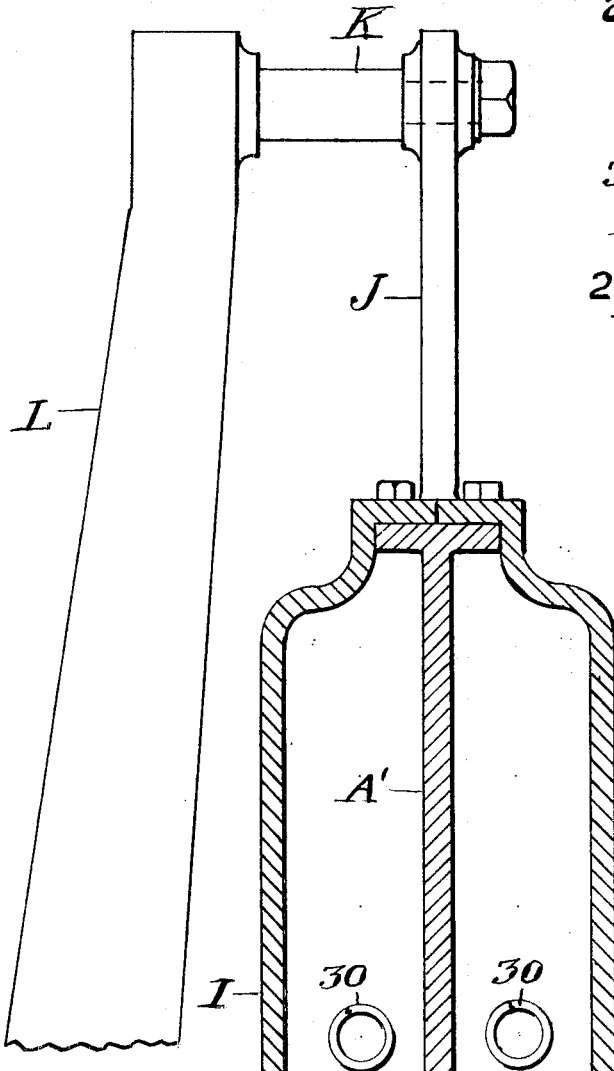
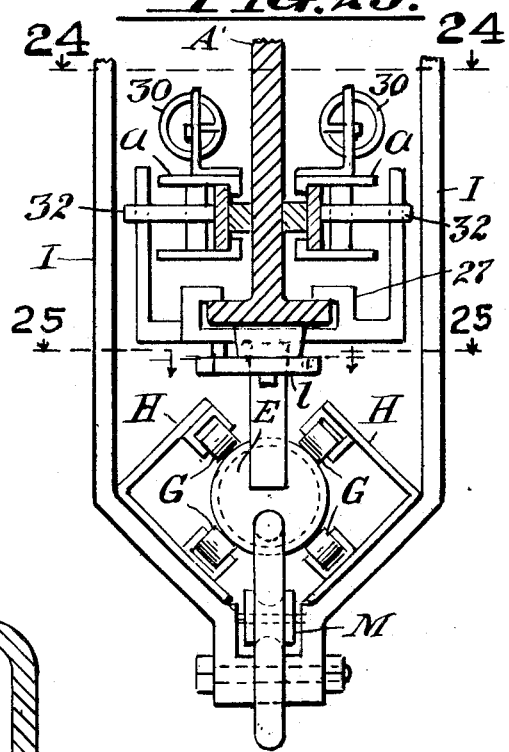
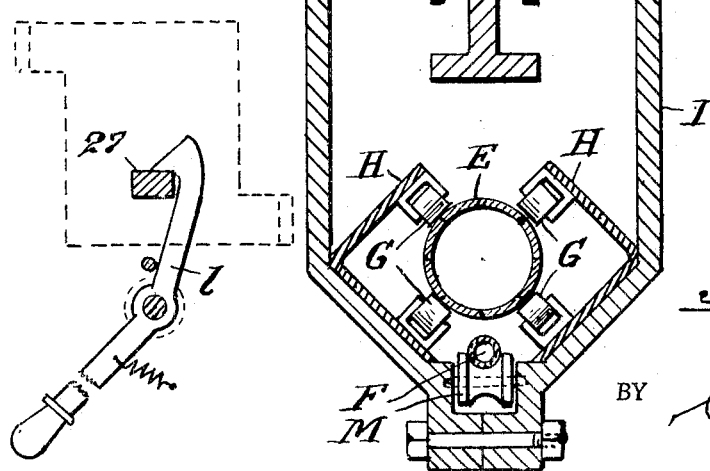
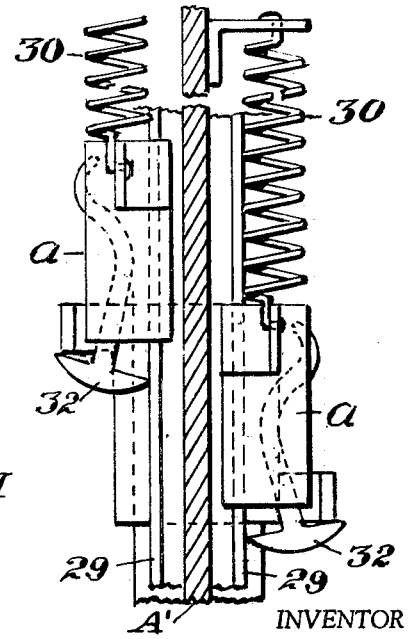

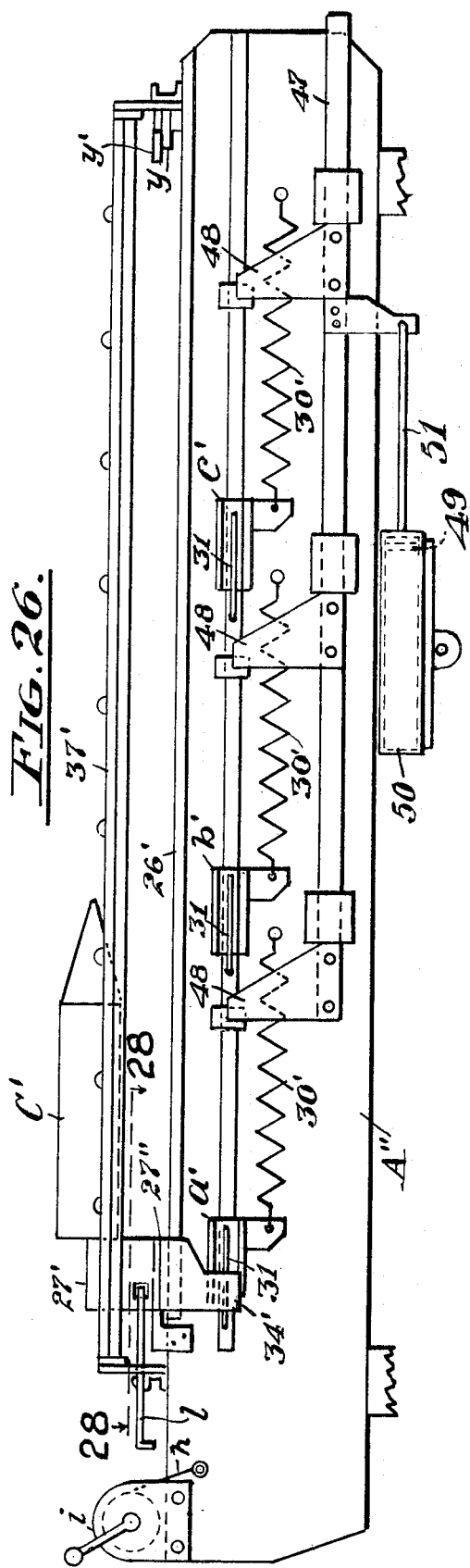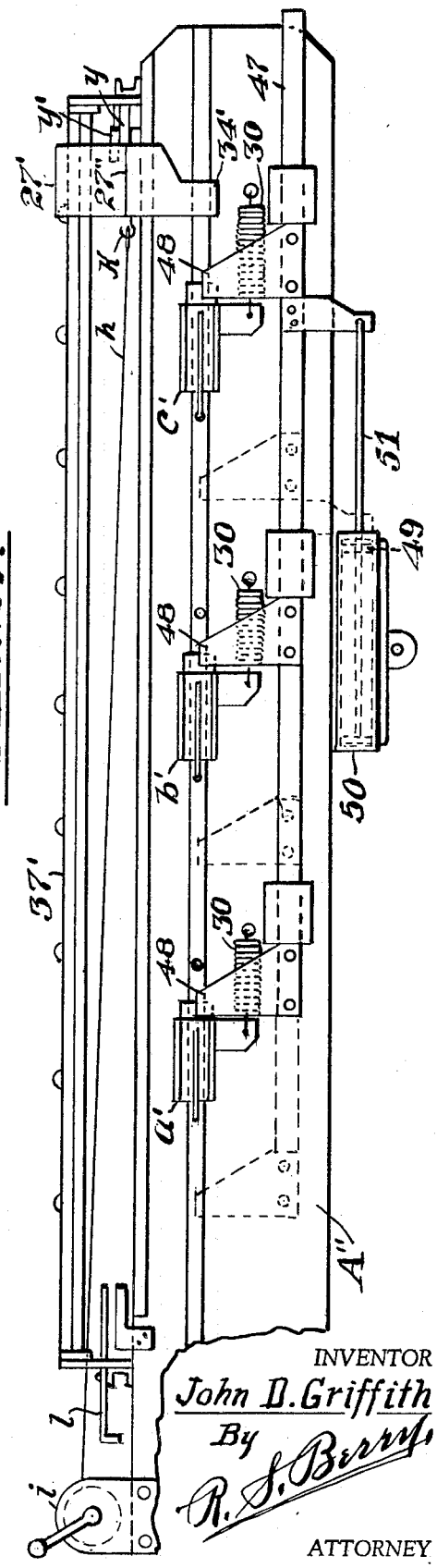

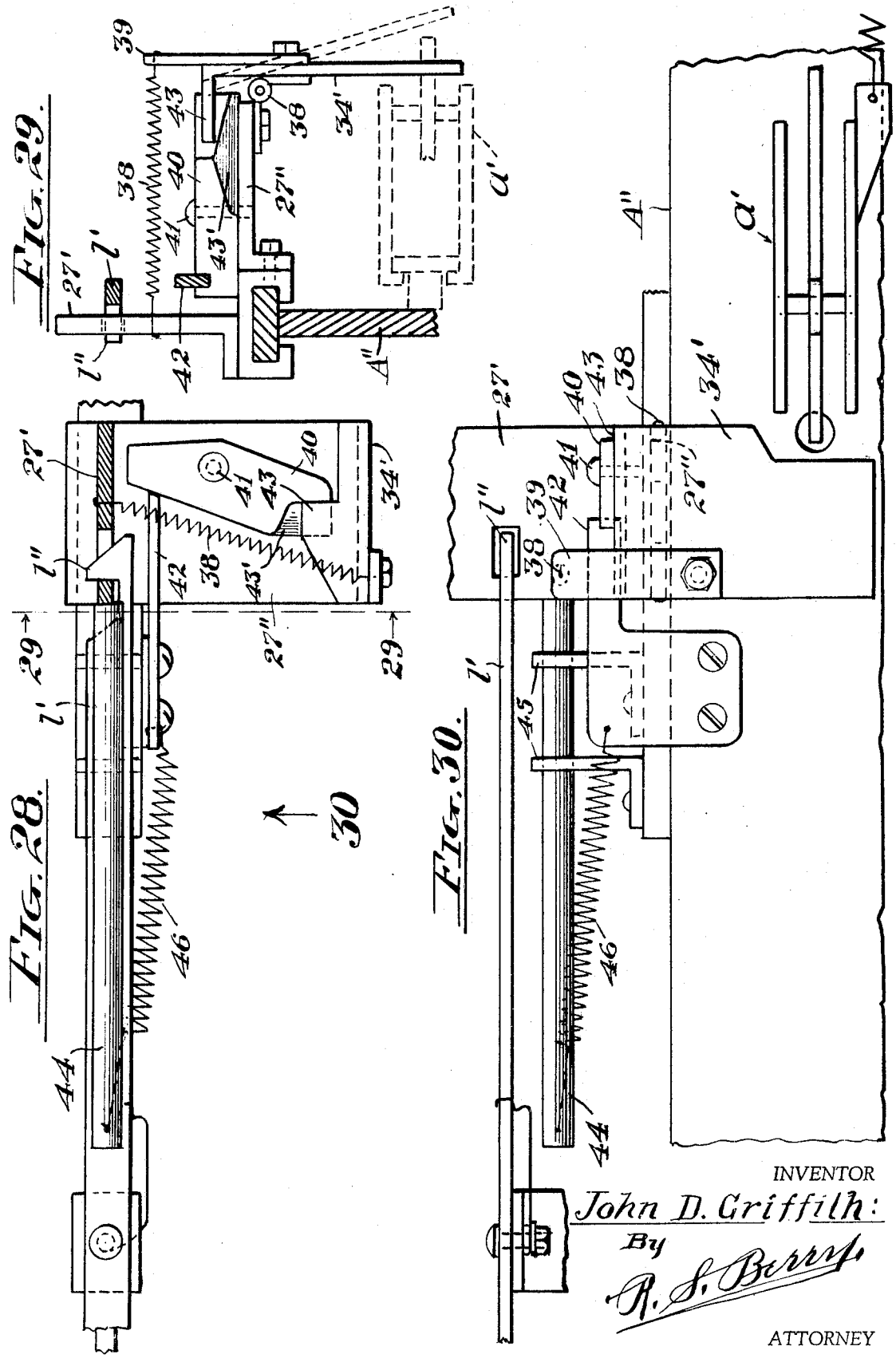

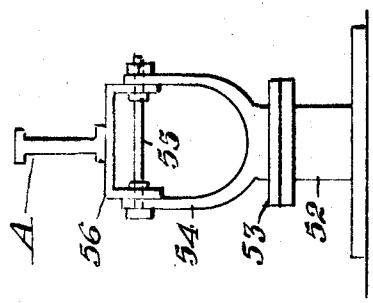
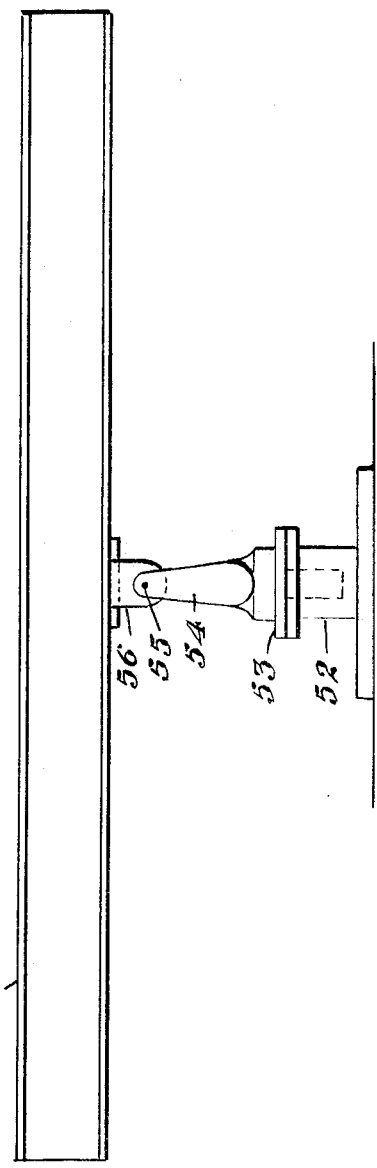
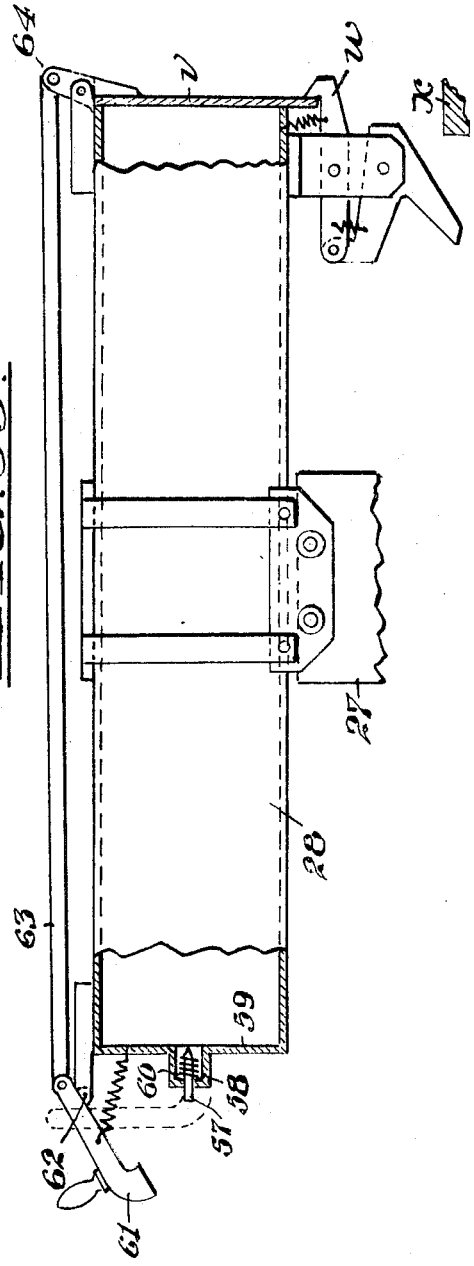

United States Patent Office 3,512,513
Patented May 19, 1970

3,512,513
ELASTIC TYPE MULTISTAGE CATAPULT
John D. Griffith, 625 N. Kalsman Ave.,
Compton, Calif. 90220
Filed Aug. 7, 1967, Ser. No. 665,659
Int. Cl. F41f 7/00
U.S. Cl. 124—26
8 Claims

ABSTRACT OF THE DISCLOSURE

A machine for ejecting objects by spring action wherein the object is carried on an elongate guideway and is advanced by a series of successively operated spring actuated power units of progressingly increasing magnitude, whereby the object is set in motion by the weaker unit with its movement along the guideway accelerated by the action of the remaining power units whereby the object will be ejected from the guideway under high velocity; the power units being retracted and the springs thereof thereby retensioned so as to condition the machine for another operation.

STATE OF THE ART

Heretofore in the production of a multi-stage catapult wherein the projectile is propelled by a series of successive spring impulses, the projectile comprising a series of telescoped sections, each provided with an independent actuating spring and wherein the several springs are contracted and held under tension within the several sections and are adapted to be successively released so that the telescoped assemblage will be initially ejected into space followed by the ejection from the first section of a second section then a third section ejected from the second section. Such a structure is set forth in U.S. Pat. No. 2,923,087 issued to R. J. Fissel on Feb. 2, 1960, Class 46, sub-class 74.

The present invention differs from that of Fissel in that the projectile of applicant is impelled into space by means of a series of successive independent impulses of successively increasing magnitude whereas the Fissel projectile assemblage is initially impelled into space under a single spring impulse and thereafter, while in space, second and third projectile sections are spring impelled from their preceeding sections.

Single spring impulse catapults are set forth in U.S. Pats. 2,611,355 and 3,250,846 selected from Class 124, sub-class 26 and also Pats. No. 2,860,620, 3,207,144 selected from Class 124, sub-class 21.

OBJECTS

An object of the present invention is to provide an object supporting carriage mounted on an elongate guideway together with a spring powered unit adapted to be engaged with said carriage to effect propulsion thereof along the guideway to effect ejection of the projectile from the carriage and wherein retraction of the advanced carriage will effect retraction of the power unit and thereby re-energize or retension the spring actuating elements thereof.

Another object is to provide a construction whereby a projectile impelling carriage may be spring propelled by a series of impulses of progressively increasing force effected by means of a multiple of spring powered units, wherein the units are successively engaged with the carriage and disengaged therefrom so as to act independent of each other in propelling the carriage.

The invention is illustrated by way of example in the accompanying drawings in which:

FIG. 1 is a view of the catapult as seen in side elevation showing the parts as positioned in readiness to effect discharge of a projectile therefrom;

FIG. 2 is a view similar to that of FIG. 1 showing the parts as positioned immediately after being operated to effect ejection of a projectile;

FIG. 3 is an enlarged detail in horizontal section as seen on the line 3—3 of FIG. 1 showing the projectile carriage releasably held in its retracted position;

FIG. 4 is a detail in horizontal section as seen on the line 4—4 of FIG. 1 with parts broken away illustrating a spring actuated impeller as releasably held in its retracted position;

FIG. 5 is an enlarged detail in horizontal section and plan view as seen on the line 5—5 of FIG. 1;

FIG. 6 is an enlarged detail in cross section taken on the line 6—6 of FIG. 1;

FIG. 7 is an enlarged fragmentary detail in elevation as seen on the line 7—7 of FIG. 6;

FIG. 8 is a horizontal section and plan view taken on the line 8—8 of FIG. 7 showing the impeller in an unlatched position;

FIG. 9 is a view similar to FIG. 8 showing the impeller in its latched position;

FIG. 10 is a detail in cross section taken on the line 10—10 of FIG. 9;

FIG. 11 is a view in elevation of the leading end of the catapult;

FIG. 12 is a view in elevation of the trailing end of the catapult;

FIG. 13 is a view in section taken on the line 13—13 of FIG. 12 showing the parts as positioned when effecting discharge of a projectile;

FIGS. 14 and 15 are details in longitudinal sections depicting modified forms of the projectile carriage;

FIG. 16 is a diagrammatic plan view partly in section illustrating the mode of operation of the catapult in effecting advance of the projectile carriage;

FIG. 17 is a similar view illustrating the manner of retracting the catapult carriage;

FIG. 18 is a plan view of a fragmentary portion of the catapult where equipped with a single impeller;

FIG. 19 is an isometric view of the impeller illustrating the mode of effecting inter-connection between the impeller and the projectile carriage;

FIG. 20 is a view in side elevation of a modified form of the invention;

FIG. 21 is a plan view of the structure shown in FIG. 20;

FIG. 21A is a horizontal section and plan view as seen on the line 21A—21A of FIG. 20 with parts broken away;

FIG. 22 is an enlarged view in cross section partly in elevation as seen on the line 22—22 of FIG. 20;

FIG. 23 is an enlarged cross sectional view with parts shown in elevation taken on the line 23—23 of FIG. 20;

FIG. 24 is a detail horizontal section and plan view as seen on the line 24—24 of FIG. 20 with parts removed;

FIG. 25 is a detail in section and plan taken on the line 25—25 of FIG. 23;

FIG. 26 is a view in side elevation depicting a modification of the invention, showing the catapault in its loaded condition preliminary to discharge of the projectile;

FIG. 27 is a view similar to FIG. 26 showing the catapult with the parts disposed immediately following ejection of the projectile;

FIG. 28 is an enlarged horizontal section and plan taken on the line 28—28 of FIG. 26 showing the trigger controlled projectile propelling carriage in its retracted position preliminary to release thereof;

FIG. 29 is a view in section and elevation as seen on the line 29—29 of FIG. 28;

FIG. 30 is a view in elevation of the structure shown in FIG. 29;

FIG. 31 is a view in side elevation depicting an adjustable mounting for the catapult beam whereby the projectile may be directed upwardly, downwardly or laterally from a central point;

FIG. 32 is an end view of the structure shown in FIG. 31; and

FIG. 33 is a view in side elevation with parts shown in section, of the catapult magazine as particularly adapted to firing an explosive shell wherein a fuse controlling explosion of the shell is automatically ignited on discharge of the shell from the magazine.

Referring to FIGS. 1 to 19 incusive of the drawing A indicates a portable elongate rectangular panel normally extending horizontally and here shown as supported edge wise on legs B. A rail 26 extends along the upper edge of the panel with its side margins projecting laterally from opposite sides of the panel as shown in FIG. 6, which rail serves as a guideway for a carriage 27 on which is mounted a horizontally extending tubular magazine 28 for the reception of a projectile C adapted to be ejected from the forward end of the magazine by forcibly impelling the carriage along the rail from its retracted position shown in full lines in FIG. 1 of the drawing to an abrupt stop at its advanced position shown in FIG. 2, as will presently be described.

Means are provided for propelling the carriage 27 along the rail 26 from its retracted position which consists of a plurality of independent spring actuated power units, here shown in FIGS. 1 and 2 as four in number, indicated at $a$, $b$, $c$ and $d$, which units are longitudinally spaced apart and slidably mounted on a side rail 29 on and extending lengthwise of the panel A in parallel relation to the top rail 26. Each of the power units is normally disposed in a position against a fixed resilient stop $e$ on the panel A and extending astride the rail 29, as indicated in FIG. 2; the power units each being independently and successively advanced against its companion stop under the urge of one or more powerful pull strings 30 leading between a projection $f$ on the unit and a bracket $g$ on the panel A.

As here shown in FIGS. 1 and 2, the several power units $a$, $b$, $c$ and $d$ are equipped with spring actuators 30 of various magnitudes ranging from the rearmost to the foremost unit, here shown as accomplished by varying the number of springs employed in the several units ranging from a single spring associated with the rear end unit $a$ to four springs associated with the forward end unit $d$.

The several units $a$, $b$, $c$ and $d$ are designed to be successively retracted in reverse order from the position shown in FIG. 2 to that shown in FIG. 1 to place the actuating springs 30 under tension, which is effected by retraction of the carriage 27 from its advanced position shown in FIG. 2 to its retracted position shown in FIG. 1, which is here shown as effected by a pull cord $h$, leading from a manually operable winding drum $i$ pivotally carried on the panel A; the cord having a ring $j$ on the outer end thereof detachably engagable with a hook $k$ on the carriage 27 when needed.

The catapult embodies a construction whereby the carriage 27 in moving rearwardly from its advanced position will initially engage the forward end unit $d$ and convey it to its retracted position shown in FIG. 1, where a latch on the unit will snap into engagement with the rail 29 and the unit detached from the carriage 27 whereupon the retracting carriage will successively engage and retract units $c$, $b$, and $a$ of which the units $c$ and $b$ will separately snap into engagement with the rail 29 in their order, as will presently be described. The carriage 27, when fully retracted will be engaged and held by a latch $l$ whereby the leading power unit $a$ engaged by the carriage will be held in its retracted position with the propelling spring 30 thereof under tension as shown in FIG. 1.

To accomplish the above operation, each of the units $a$, $b$, $c$ and $d$ embodies the construction particularly shown in FIGS. 8, 9, 10 where the end unit $a$ is shown in its fully retracted position in FIG. 8, while FIG. 9 shows one of the other units $b$, $c$, or $d$ latched in its retracted position.

As shown in FIG. 10, the side rail 29 is of T-cross section with its web $z$ abutting the side of the panel A and extending longitudinally thereof with the margins $m$—$m$ of the outer portion of the rail 29 projecting laterally from the web $z$ to provide the rail 29 with channels $n$ on its opposite sides as particularly shown in FIG. 10. Each of the above recited power units embodies spaced apart side walls $o$—$o$ which overlie the margins $m$—$m$ of the rail 29 in slidable relation thereto and have projections $p$—$p$ on their inner margins which slidably project into the rail channels $n$—$n$ and whereby the unit is slidably supported on the rail 29.

The side walls $o$—$o$ are connected together and spaced apart by a spacer $q$ and a pivot pin $r$. Mounted intermediate its ends on the pivot pin $r$ is an elongate arm 31 extending between the side walls $c$—$o$ with one end thereof a laterally projecting T-head 32. The inner end of the arm 31 is formed with a curved laterally extending terminal or bend 33 arranged to be positioned to project outwardly from the front of the unit into the path of a downwardly projecting hanger 34 extending from the carriage 27. The inner ends of the T-head 32 on the units $b$, $c$ and $d$ are engageable with spaced apart slots 35 in the rail 29 when such power units are in their fully retracted positions, as indicated in FIG. 9. When this occurs the bend 33 on the arm 31 is advanced to its outermost position as shown in FIG. 9.

When the end power unit $a$ is in its fully retracted position and releasably held in such position by the latch $l$ engaging the carriage 27, the arm 31 will be disposed with the inner end of the head 32 slidably seated on the outer face of the rail 29 and with the outer end of the head abutting the adjacent margin of the changer 43 depending from and affixed to the carriage 27 whereby the power unit $a$ will be releasably held in its fully retracted position as shown in FIGS. 16 and 19.

Means are provided for advancing the arm 31 from its outermost position shown in FIG. 8 to its innermost position depicted in FIG. 9 when the head 32 is opposite a slot 35 and for releasably locking the arm in its rail engaging position in opposition to the pull-springs 30 against accidental release. This means embodies a pawl D pivoted intermediate its ends to swing horizontally on a pivot pin $s$ as particularly shown in FIGS. 9–10. The pawl D has a rounded short inner end $u$ presented to the outer edge of the arm 31 and adapted on swinging the pawl under the urge of a spring $t$ (shown in FIG. 10) to advance the end $u$ thereof against the arm to swing the latter inwardly into engagement with the slot 35 as shown in FIG. 9. The pawl D normally projects substantially at right angles to the arm 31 when the latter is in its innermost position with its outer end portion projecting outwardly from the outer margin of the power unit in the path of travel of the depending hanger 34 as indicated in FIG. 9. When thus positioned the pawl D will act to lock the arm 31 in its innermost position against displacement subject to being engaged and rocked by the advancing hanger 34 on the carriage 27, as indicated in FIG. 8 to thereby release the arm 31 so that continued advance of the hanger 34 will abut and ride over the bend 33 on the inner end of the arm as indicated in dotted lines in FIG. 8, thereby swinging the arm 31 so as to withdraw the head 35 out of engagement with the slot 35 whereupon the tensioned spring or springs 30 act to advance the unit with the outer portion of the head 32 thereof abutting the adjacent margin of the hanger 34 so as to impel the carriage 27 and its cargo along the rail 26.

Where the load on the carriage is considerable, the magazine 28 is supported on rollers 36 on a pair of rails 37 extending above and parallel with the top rail 26 as particularly shown in FIG. 6.

In conditioning the catapult for operation, the carriage 27 with the magazine 28 thereon is retracted from the advanced position shown in FIG. 2 to its rearward position shown in FIG. 1, and there engaged by the latch *l* as above described.

The magazine 28 is here shown as cylindrical and extended horizontally on the rollers 36 and as having an open forward end fitted with a closure *v* hingedly mounted at its upper end and detachably secured in its closed position by a latch *w* while the magazine is in its rearmost position and while traversing the rails 37. The latch *w* is actuated by a trip *x* as the carriage 27 and magazine 28 approach their forwardmost position against a resilient abutment *y* shown in FIGS. 1 and 2; the abutment *y* being mounted on the top of the rail 26 and extending into the path of the hanger 34 on the magazine so as to arrest the forward movement of the magazine and carriage adjacent the forward end of the panel A. The magazine 28 is loaded with the object C while in its retracted position, the closure *v* then being temporarily opened for this purpose, then closed as indicated in FIG. 5.

When it is desired to actuate the loaded catapult, the latch *l* particularly shown in FIGS. 1, 2 and 3, is manually shifted out of engagement with the retracted carriage 27 thereby permitting the expanded spring 30 connected to the unit *a* to impel the latter forward from the position shown in FIGS. 1 and 8 to the position shown in FIG. 2 where the unit *a* is brought to rest against the stop *e*. When this occurs the hanger 34 on the carriage 27 together with the magazine 28 will continue to advance a short distance under momentum until the hanger 34 passes the head 32 on the arm 31 of the unit *b*. The hanger 34 will then successively engage the pawl D and the inner end 33 of the arm 31 and in passing thereover will actuate same so as to withdraw the head 32 out of engagement with the slot 35 in the rail 29 thereby releasing the unit *b* so that the springs 30 thereon will act to advance the unit *b* together with the carriage 27 and magazine 28, as indicated in FIGS. 9 and 8.

In like fashion the hanger 34 will be projected successively from the advanced unit *b* to the unit *c* and from the advanced unit *c* to the unit *d* with increasing speed and power until the hanger 34 is brought to rest against the abutment *y* and the unit *d* is brought to rest against its stop *e* as shown in FIG. 2.

As the magazine 28 approaches the terminus of its forward movement the latch *w* thereon is engaged and actuated by the trip *x* so as to disengage the closure *v* and cause it to open under its impetus and the thrust of the projectile C whereupon the projectile will be ejected forwardly from the catapult.

In the form of the invention shown in FIGS. 20 to 25 inclusive, the catapult is especially adapted for use in fire fighting equipment as a means for ejecting into a zone of fire fluid discharge nozzle E attached to a hose F connected with a source of fire extinguishing liquid or gas.

As here shown in FIGS. 20–22–23, the nozzle E, constituting a combined projectile and carriage, is mounted for longitudinal movement between a series of rollers G disposed at intervals along an elongate open ended guideway H. A series of spaced hangers I depending from an elongate horizontally extending beam A' support the guideway H in a suspended position; the beam A' being carried on a hanger J carried on a pivot-pin K projecting from a derrick boom L which latter affords a means whereby the beam A' may be raised and lowered and tilted at various angles on the pivot-pin K.

In this instance the hose F leads from the rear end of the nozzle E forwardly between the hangers I—I to the forward end of the structure and is supported on rollers M at the lower ends of the hangers; the hose leading from the forward end roller to a suitable supply of fire extinguishing fluid under pressure.

In other respects the operating elements of the catapult set forth in FIGS. 20 to 24 inclusive substantially correspond to those of the form of the invention shown in FIGS. 1 to 19 except that a set of such elements is provided on each of the opposite sides of the panel A' instead of on one side only thereof, with the operating springs 30 arranged above the impeller units *a-b-c-d* instead of therebeneath, and the carriage 27 is mounted on the lower flange of the supporting panel A' instead of a rail 26 on the upper margin of the panel A. By arranging the operating elements on opposite sides of the panel the sets of operating elements on one side of the panel may be offset longitudinally of the panel A relative to the complementary elements on the opposite side of the panel whereby the opposed elements will operate in alternate overlapping relation to each other so that a continuous propelling force will be applied to the projectile throughout the course of its travel along the length of the panel to its point of discharge therefrom instead of intermittently as where the propelling units are arranged on one side only of the panel A as previously described.

In the construction and arrangement shown in FIGS. 26 to 30 inclusive, the projectile C' is supported directly on roller equipped rails 37' and when in its retracted position and while being advanced on the rails is releasably engaged by an upstanding projection 27' on a carriage 27'' slidably mounted on a rail 26' on the upper margin of a horizontally extending panel A''. A hanger 34' mounted on the carriage 27'' projects downwardly for successive engagement with a plurality of propelling units *a'–b'–c'* actuated by springs 30', as previously described.

In this instance the hanger 34' is connected by hinges 38 at its upper end to the carriage 27'' as shown in FIG. 29 so that the lower end of the hanger may be swung outward to clear the propelling units *a'–b'–c'* when retracting the carriage, as will be later described; the hanger being then swung to its outermost position by a pull spring 38 extending between a bracket 39 affixed to the upper end of the hanger 34' and the upstanding projection 27' on the carriage 27''. The hanger 34' is releasably fastened in its innermost position when the carriage 27'' is in its retracted position by means of an arm 40 pivoted at 41 to swing horizontally on the carriage 27'' and having its outer end adapted to abut the inturned upper end portion of the hanger as shown in FIGS. 28–29 to thereby hold the hanger in its upright position in opposition to the pull of the spring 38, shown in FIG. 29. The inner end of the arm 40 is extended from the pivot 41 so that when the carriage 27'' is in its retracted position a side margin of the inner end portion of the arm 40 will be seated against an abutment 42 projecting from the beam A'' whereby the outer end of the arm will be advanced and held against a flange 43 projecting from the inner side of the upper end of the hanger 34' as shown in FIGS. 28–29; the upper face of the outer end portion of the arm 40 having a recess to receive the flange 43 which recess has an inclined bottom wall 43' adapted to slidably engage the under side of the flange 43 on advance movement of the outer end of the arm 40 when the hanger 34' is in its outwardly inclined position indicated in dotted lines in FIG. 29, whereby the arm 40 will act on the flange 43 to swing the hanger 34' to its upright position and to hold it in such position as indicated in full lines in FIG. 29.

The foregoing described operation occurs during movement of the carriage 27'' into its fully retracted position where it will be releasably held by the manually controlled latch *l'* as described in connection with the structure set forth in FIG. 1; the latch *l'* having a head *l''* detachably engageable with the wall 27', as shown in FIGS. 28–30.

In this instance, means are provided for imparting an initial impulse to the carriage on release of the latch *l'* here shown as comprising a plunger 44 slidably mounted in a pair of spaced guideways 45 carried on the beam A″; the plunger 44 extending in parallel relation to the upper margin of the beam with its forward end abutting the upstanding member 27′ of the carriage 27″ under the urge of a pull spring 46. Retraction of the carriage to near its rearwardmost position brings the member 27′ against the forward end of the plunger so that continued rearward movement of the carriage to its fully retracted position will act to retract the plunger 44 thereby placing the spring 46 under tension.

A feature of the construction set forth in FIGS. 26–27 resides in the embodiment of powered means for retracting the propulsion units in lieu of the manually operated means for retracting the propulsive carriage, which means is here shown as embodying a reciprocal shaft 47 mounted beneath the assemblage of spring powered propulsive units $a'-b'-c'$ on which is mounted projections 48 extending upwardly in front of the units so that on retraction of the shaft 47 when the units are in their advanced positions the projections will collectively engage the units and effect their movement to their retracted positions. This operation is here shown as accomplished by fluid pressure imposed on a piston 49 mounted in a cylinder 50 which piston is connected to the shaft 47 by a rod 51 in a usual manner.

By the above recited construction and arrangement the propulsive units $b'-c'$ are collectively retracted and held with their actuating springs 39′ under tension by engagement of the headed arms 31 of the units engaged with the beam A″, while the leading unit $a'$ is releasably held in its fully retracted position by the manually controlled latch $l$ then engaged with the carriage 27″ which in turn is detachably connected to the unit $a'$ through the hanger 34′ on the carriage then engaging the headed arm 31 on the unit $a'$ in the manner previously described.

On operation of the latch $l$ to release the carriage 27″ the latter will be advanced along the guideway 37 under the urge of the springs 30 so as to propel the projectile C′ along the guideway to discharge as before described. During this operation the hinged hanger 34′ on the carriage 27″ will be maintained in its inner and upright unit engaging position by frictional engagement of the flange 43 on the upper end of the hanger with the inclined bottom wall 43′ of the arm 40 under the urge of the pull spring 38. As the carriage 27″ approaches its outermost projectile impelling position an extension $y'$ on the abutment $y$ on the beam A″ extending in the path of the inner end portion of the arm 40 is impacted by such end portion so as to act to swing the arm in a direction to withdraw the inclined wall 43′ thereof out of engagement with the flange so as to permit the pull spring 38 to swing the hanger 34′ into its outermost position indicated in dotted lines in FIG. 29. The carriage 27″ will then be manually retracted by means of the cable $h$ as before described in connection with the carriage 27 of the structure set forth in FIG. 1, except that in this instance the depending hinged hanger 34′ on the advanced carriage 27″ having then been disengaged from the arm 40 by retraction of the latter by the abutment $y'$, such hanger will then freely pass over the several units $c'-b'-a'$.

The catapult herein set forth, while being particularly adapted to be operated in a fashion similar to that of a mortar, that is, in propelling an explosive projectile into space on a trajectory curve, it may also be mounted so that it may be aimed to direct the projectile toward a selected objective. To accomplish this purpose, the catapult beam is mounted as depicted in FIGS. 31–32 wherein the beam A is pivotally supported intermediate its ends for horizontal turning movement and vertical swinging movement. As here shown the catapult support comprises a fixed base 52 on which is mounted a conventional turntable 53 having an upwardly extending yoke 54 fixed on and projecting upward from the upper portion thereof on which is carried a rock-shaft 55 affording a pivotal support for a companion yoke 56 on which is affixed the horizontally extending catapult beam A.

The catapult herein set forth is particularly adaptable to directing explosive shells toward a selected target. When employed for this purpose the magazine 28 is equipped with a firing-pin 57 reciprocally mounted in a guideway 58 on the rear end wall 59 of the magazine 28 as shown in FIG. 33; the firing-pin extending axially of the magazine and being normally disposed in a retracted position under the urge of a spring 60 and being operable on being advanced to explode a cap to ignite a fuse on the projectile C contained in the magazine in the usual manner.

Actuation of the firing-pin 57 is here shown as effected by a spring pressed trigger 61 pivoted at 62 intermediate its ends having its inner end connected by a link 63 to a bracket 64 on the magazine closure $v$; the parts being so arranged that when the closure $v$ is in its closed position the trigger 61 will be held in its retracted position as shown in FIG. 33. By the above recited arrangement, opening of the closure $v$ on tripping the latch $w$, which occurs when the magazine 28 reaches its forward position, the trigger 61 will be simultaneously released so as to actuate the firing-pin 57 to thereby ignite the fuse attached to the explosive shell being then ejected from the magazine.

Manifestly the magazine 28 may be of any suitable construction according to the use to which the catapult is to be put, such for example as illustrated in FIGS. 14 and 15, wherein in FIG. 14 the magazine is shown as comprising an open trough 28′ in which a projectile C″ is seated and releasably held by a trip latch $w'$ on the trough engaged with a flange $z$ on the projectile; the trough 28′ being mounted on the upstanding portion of the carriage 27.

In FIG. 15 the projectile P is shown as being spherical and as seated in a carrier Q conformable to a portion of the projectile, which carrier is mounted on the upstanding portion of the carriage 27 and arranged so that on impelling the carriage along the catapult as previously described, the projectile P may be ejected from the carrier Q.

I claim:

1. A catapult comprising an elongated rail, a projectile carriage mounted on said rail for longitudinal movement thereon, a support for said rail, an impeller unit mounted for movement longitudinally of said rail, means detachably interconnecting said impeller unit and carriage, first spring means for advancing said impeller unit along said rail, means on said support for arresting the advance of said impeller unit, another impeller unit slidably mounted in spaced alignment with said first named impeller unit, a series of second spring means generally aligned with said first spring means for advancing said last named impeller unit, means for releasably inter-connecting said last named impeller unit and carriage and for continuing the advancement of said carriage immediately following the arrested advance of said first impeller unit, and cushioned means on said support for arresting the final advance of said last named impeller unit.

2. The structure called for in claim 1 in which the several spring means actuating the several impeller units are of progressively increasing power output in the order of their successive operations.

3. In a catapult, an elongate guideway, a support therefor, a carriage on said guideway movable longitudinally thereof, a projectile support on said carriage, a spring actuated impeller unit, a rail on said guideway extending lengthwise thereof on which said unit is longitudinally movable, a rocker-arm pivotally mounted on said unit, means for engaging said rocker-arm with said rail to hold said unit in a retracted position, and means on said carriage engageable with said rocker-arm operable to disengage said rocker-arm from said rail to thereby release said unit.

4. The structure called for in claim 3 wherein said means for engaging said rocker-arm and rail embodies a cross head on one end of said rocker arm and an aperture in said rail with which one end of said cross-head is detachably engageable and wherein said last named means is engageable by the other end of said cross-head to effect advance of said carriage by said impeller unit.

5. A multistage catapult comprising an elongate horizontally extending panel A, means supporting said panel edgewise B, a rail 26 mounted on said panel and extending along the upper margin thereof, a carriage 27 mounted on said rail for movement back and forth longitudinally thereof, an explosive projectile receiving magazine 28 affixed on said carriage having an outlet from which a projectile may be ejected, multiple power units 30 for advancing said carriage step-by-step lengthwise of said rail forwardly thereof, resilient means y for bringing the carriage to a cushioned stop at the forward end of said rail whereby a projectile in said magazine will be ejected therefrom and manually operable means l for releasably holding said carriage in its fully retracted position on said rail preliminary to its release for ejection of an explosive projectile therefrom.

6. The structure called for in claim 5 together with a side rail mounted on and extending longitudinally of said panel on which said power units are slidably mounted, elongate coiled springs for actuating said power units having one end thereof attached to said panel, means connecting said springs independently to said units in pulling relation thereto, means whereby moving said carriage to its fully retracted position said springs will be placed under tension, and means on said side rail for arresting forward movement of said units under the urge of said springs independently.

7. An elastic multistage catapult comprising, an edgewise supported horizontally extending elongate panel, a rail carried on and extending lengthwise of said panel, a carriage mounted on said rail for reciprocal movement lengthwise thereof, a projectile receiving and conveying magazine on said carriage adapted to have a projectile ejected therefrom at the terminous of forward movement of the carriage on said rail, a plurality of longitudinally spaced apart pull springs extending lengthwise of said panel and separately attached to the panel at their forward ends, means whereby the leading one of said springs when expanded under tension may be engaged at its outer end relative to said carriage when the latter is in its fully retracted position, manually operable means for actuating said last named means to release said carriage when held in its fully retracted position in opposition to said leading spring, releasable means for independently holding the remainder of said longitudinally spaced pull springs expanded under tension apart from said carriage when said carriage is fully retracted, means on said carriage progressively engageable with said last named means to successively and independently engage said tensioned springs with said carriage to effect continual advance of the carriage following the action of said leading spring thereon, cushion means for bringing the carriage to a stop at the forward end of said rail whereby a projectile a said magazine will be ejected therefrom.

8. The structure called for in claim 7 together with a base, a turn-table mounted on said base, and an upright support fixed on said turn-table on which said horizontally elongate panel is pivotally mounted for free vertical swinging movement.

References Cited

UNITED STATES PATENTS

| | | | |
|---|---|---|---|
| 1,892,381 | 12/1932 | Bushmeyer et al. | |
| 2,611,355 | 9/1952 | Ashwood | 124—26 |
| 2,921,574 | 1/1960 | Saito | 124—29 |
| 2,939,449 | 6/1960 | Kortick | 124—27 XR |
| 2,587,687 | 3/1952 | Beyers | 124—29 XR |
| 2,860,620 | 11/1958 | Effinger | 124—21 |

GEORGE J. MARLO, Primary Examiner

W. R. BROWNE, Assistant Examiner

U.S. Cl. X.R.

124—31, 41